(No Model.)
W. W. WHIDDIT.
REGARBONIZER FOR FILTERS.
No. 450,209. Patented Apr. 14, 1891.
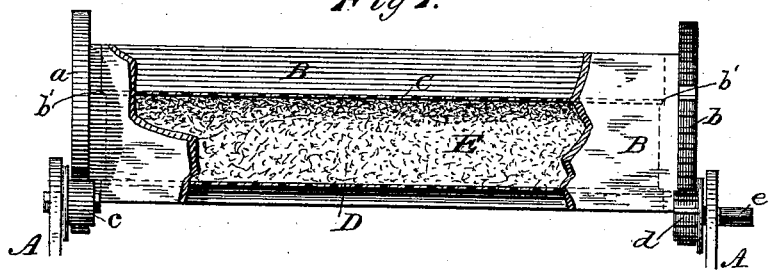
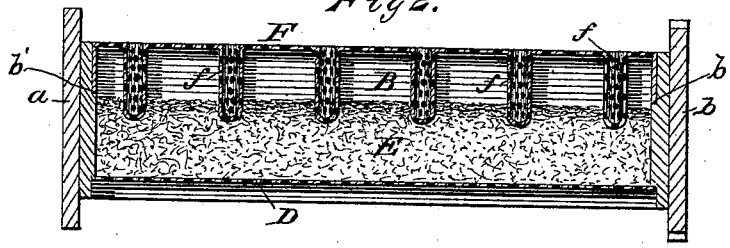
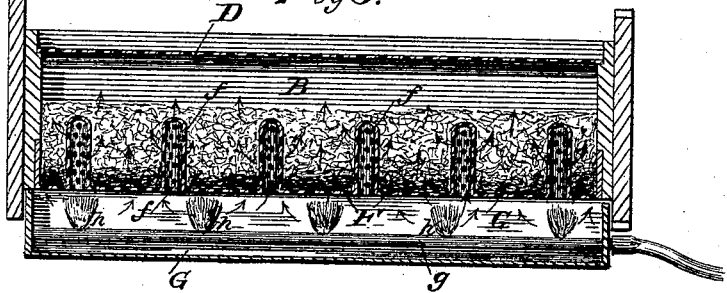
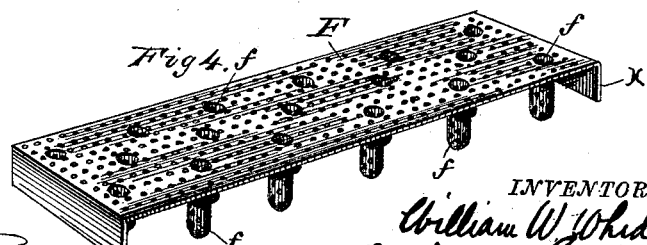
WITNESSES
INVENTOR
William W. Whiddit
By Irving Uting
Attorney

UNITED STATES PATENT OFFICE.

WILLIAM W. WHIDDIT, OF NEWBURG, NEW YORK.

RECARBONIZER FOR FILTERS.

SPECIFICATION forming part of Letters Patent No. 450,209, dated April 14, 1891.

Application filed April 24, 1890. Serial No. 349,237. (No model.)

*To all whom it may concern:*

Be it known that I, WILLIAM W. WHIDDIT, a citizen of the United States, residing at Newburg, in the county of Orange and State of New York, have invented certain new and useful Improvements in Recarbonizers for Filters; and I do hereby declare the following to be a full, clear, and exact description of the invention, such as will enable others skilled in the art to which it appertains to make and use the same.

My invention relates to recarbonizers for filters, in which charcoal or any similar substance is used as the filtering material, which occasionally needs renewing or oxidizing by heat; and the objects of my improvement are, first, to provide an attachment for recarbonizing the charcoal, which is applicable to any size or shape of filter; second, to effect the recarbonization of the charcoal without the removal or handling of the filtering material, and, third, to provide a recarbonizer having the above advantages, together with an adaptability for receiving heat by different means, whether by gas, by steam, or by hot air. I attain these objects by the device illustrated in the accompanying drawings, in which—

Figure 1 is a side elevation of filter bed or box with a side partially broken away to show the position of the charcoal or filtering material which it contains. Fig. 2 is a sectional view of the same after the removal of the upper filter-screen and the attachment in its place of my recarbonizing-screen. Fig. 3 is a similar view of the filter-bed with my recarbonizer attached, but completely reversed in position, and showing the introduction of heat to the recarbonizer at the bottom by means of gas-jets; and Fig. 4 is a perspective view showing my recarbonizing attachment or screen apart from the filter.

Similar letters refer to similar parts throughout the several views.

The side frames A may support any required number of filter beds or boxes B, which may be readily reversed by the rollers $a\,c$ and cog-gearing $b\,d$ when it is necessary to cleanse or recarbonize the filtering material E.

C and D are perforated screens, preferably of metal, for holding the filtering material E in place.

F represents my recarbonizing attachment, also preferably of metal and perforated, and $f\,f$ represent tubes of similar material projecting downward from the plane surface of the recarbonizer at short distances from each other and having a length very nearly equal to the depth of the filtering material.

G represents a heating attachment having gas-pipe $g$ and gas-jets $h$ for conveniently applying heat to my recarbonizer, as shown in Fig. 3.

The application of my recarbonizer to the filter is so clearly shown in the drawings as to need no extended description. After the charcoal becomes lifeless and unfit for use, and after it has been cleansed by the passage of water through it from a direction opposite to the usual one, the upper screen C is removed and the recarbonizing-screen F $f$ is attached, as shown in Fig. 2. Then the normal position of the filter-bed is reversed and the charcoal falls loosely about the recarbonizing-tubes $f\,f$, because the plane surface F of the recarbonizer is some little distance above the position of the removed screen C. This loosening and readjustment of the filtering material about and above the recarbonizer fits it to receive and be most quickly affected by the heat, which may be introduced by gas-pipes with jets, as shown in Fig. 3, or by hot air conducted to a closed box G underneath F $f$, or by steam-pipes connecting with the same, as may be most convenient. The length of time required for the complete recarbonization of the charcoal will depend somewhat upon the precise nature of the filtering material, the number of the tubes $f\,f$ in a given area, and the length of time the charcoal has been used. When the recarbonization seems to be complete, the heating attachment may be removed and the filter reversed until brought again into its normal position. Then F $f$ is removed, the upper screen C replaced, and the filter is again in perfect condition for work.

It would be consistent with my invention that the recarbonizer F $f$ should be permanently attached to the filter; but it would need to be somewhat below the upper edge of the filter-box B, and would not, if it replaced C altogether, give the same opportunity for loosening the filtering material that is given by the method illustrated in the drawings.

The plate F may be provided with flanges $x\ x$, by means of which it is supported a distance above the mass of filtering material, or, in other words, to form a larger space to permit of the mass freeing itself and the particles thereby becoming separated when the box is rotated or reversed, thus enabling the recarbonizing medium to more thoroughly permeate the mass. These flanges are supported upon shoulders $b'\ b'$, formed by the cut-away portions of the filter-box, said shoulders also forming the support for the screen C.

I do not limit myself to any precise size, form, or material for my recarbonizer; but,

Having thus described my invention, what I claim, and desire to secure by Letters Patent, is—

1. The combination of a reversible filter-box having its inner sides cut away to form shoulders, a lower foraminous plate, an upper foraminous plate provided with projecting reticulated tubes and also having depending side flanges adapted to be seated upon the shoulders of the box and of such length as to leave a space between the plane surface of the plate and the contained charcoal, and means for rotating the box in order to reverse the same, substantially as set forth.

2. The combination of side frames, a roller journaled in one of said frames and a cog in the opposite frame, a filter-box having at one end a cog gearing with the cog of the frame and at the opposite end a roller contacting with the roller of the adjacent frame, a lower foraminous plate, an upper foraminous plate provided with projecting reticulated tubes, a chamber beneath the filter-box, and a pipe within the chamber provided with jets and adapted to supply heat to the upper or recarbonizing plate when the box is reversed, substantially as set forth.

In testimony whereof I affix my signature in presence of two witnesses.

WILLIAM W. WHIDDIT.

Witnesses:
STEPHEN G. GUERNSEY,
IRVING ELTING.